(12) United States Patent
Geskes et al.

(10) Patent No.: US 11,233,284 B2
(45) Date of Patent: Jan. 25, 2022

(54) ACCUMULATOR ARRANGEMENT

(71) Applicant: Mahle International GmbH, Stuttgart (DE)

(72) Inventors: Peter Geskes, Ostfildern (DE); Michael Moser, Ellwangen (DE); Joachim Treier, Oppenau (DE); Georg Votteler, Backnang (DE)

(73) Assignee: Mahle International GmbH, Stuttgart (DE)

( * ) Notice: Subject to any disclaimer, the term of this patent is extended or adjusted under 35 U.S.C. 154(b) by 138 days.

(21) Appl. No.: 16/593,987

(22) Filed: Oct. 5, 2019

(65) Prior Publication Data
US 2020/0112071 A1 Apr. 9, 2020

(30) Foreign Application Priority Data

Oct. 5, 2018 (DE) ...................... 10 2018 217 102.5

(51) Int. Cl.
| | |
|---|---|
| *H01M 4/02* | (2006.01) |
| *H01M 10/625* | (2014.01) |
| *H01M 10/613* | (2014.01) |
| *H01M 10/6554* | (2014.01) |
| *H01M 10/6556* | (2014.01) |

(Continued)

(52) U.S. Cl.
CPC ............. *H01M 10/625* (2015.04); *B60K 6/28* (2013.01); *B60L 50/64* (2019.02); *H01M 10/613* (2015.04); *H01M 10/6554* (2015.04); *H01M 10/6556* (2015.04); *H01M 10/6567* (2015.04); *H01M 50/20* (2021.01); *H01M 50/24* (2021.01); *B60Y 2200/91* (2013.01); *B60Y 2200/92* (2013.01); *B60Y 2306/05* (2013.01); *B60Y 2400/112* (2013.01); *H01M 2220/20* (2013.01)

(58) Field of Classification Search
CPC ....................................................... H01M 4/02
See application file for complete search history.

(56) References Cited

U.S. PATENT DOCUMENTS

| | | |
|---|---|---|
| 2014/0338999 A1 | 11/2014 | Fujii et al. |
| 2015/0236314 A1 | 8/2015 | Lee et al. |

(Continued)

FOREIGN PATENT DOCUMENTS

| | | |
|---|---|---|
| DE | 102010013025 A1 | 9/2011 |
| DE | 102016110330 A1 | 12/2017 |

(Continued)

*Primary Examiner* — Jacob B Marks
(74) *Attorney, Agent, or Firm* — Falk Ewers; Ewers IP Law PLLC

(57) ABSTRACT

An accumulator arrangement for a hybrid or electric vehicle includes a plurality of battery cells which are stacked in a stacking direction to form at least one battery block. The at least one battery block is arranged in a housing of the accumulator arrangement. A cooling device includes a cooling plate arranged on one side on the battery block and extending parallel to the stacking direction. On the at least one cooling plate at least one cover plate with at least one cooling channel through which a coolant can flow is secured, facing away from the at least one battery block. The cooling plate forms an outer contour of the fluid-tight housing. The at least one cooling channel of the cover plate is open towards the at least one cooling plate and is closed by the at least one cooling plate.

19 Claims, 5 Drawing Sheets

(51) Int. Cl.
  *H01M 10/6567* (2014.01)
  *B60K 6/28* (2007.10)
  *B60L 50/64* (2019.01)
  *H01M 50/20* (2021.01)
  *H01M 50/24* (2021.01)

(56) References Cited

U.S. PATENT DOCUMENTS

2018/0337375 A1\* 11/2018 Kellner ............ H01M 10/6567
2019/0131602 A1  5/2019 Hilfrich et al.
2019/0301522 A1  10/2019 Negishi et al.

FOREIGN PATENT DOCUMENTS

DE    102017203648 A1  9/2018
WO    2018105505 A1   6/2018

\* cited by examiner

ACCUMULATOR ARRANGEMENT

CROSS REFERENCE TO RELATED APPLICATIONS

This application claims priority to German patent application DE 10 2018 217 102.5, filed Oct. 5, 2018, the entire content of which is incorporated herein by reference.

TECHNICAL FIELD

The disclosure relates to an accumulator arrangement for a hybrid or electric vehicle.

BACKGROUND

Hybrid and electric vehicles are gaining more and more importance. In so doing, a hybrid or electric vehicle is operated permanently or temporarily by electrical energy from an accumulator arrangement, which is charged or discharged during operation of the hybrid or electric vehicle. The accumulator arrangement usually includes here several battery blocks—so-called battery modules—of several battery cells, which are arranged in a housing. During the charging and the discharging, the accumulator arrangement heats up, which is undesirable. Thus, for example, a Li-ion battery cell must not heat up permanently above a temperature of 40° C.-50° C., because otherwise the lifespan of the Li-ion battery cells is distinctly reduced. In order to cool the accumulator arrangement, cooling plates are usually installed onto the battery blocks. Such a cooling plate is described for example in DE 10 2010 013 025 A1. The cooling plates can be in contact here with L-shaped cooling elements of aluminum in a heat-transmitting manner—for example via a thermally conductive paste. The individual cooling elements are then arranged between the individual battery cells of the accumulator arrangement and conduct from there to the cooling plates the heat generated in the battery cells.

The cooling plates are usually soldered together from two aluminum plates, between which cooling channels are located through which a coolant can flow. Extrusion profiles also come into use. The extrusion profiles are inserted into aluminum pipes or into aluminum collectors with corresponding slits or passages and are fastened thereto by hard-soldering. The cooling plates are integrated into the housing and connected fluidically toward the exterior via several lines. In the case of a leak of the cooling plate or of the line—both in the event of an accident and also in normal operation—the battery cells could, however, be flooded with the coolant and thereby the entire accumulator arrangement could be destroyed. A leak could even lead to a short-circuit in the battery block and, in the worst case, could even lead to a fire of the accumulator arrangement.

SUMMARY

It is therefore an object of the disclosure to indicate, for an accumulator arrangement of the generic type, an improved or at least alternative embodiment, in which the described disadvantages are overcome.

This object is achieved by an accumulator arrangement as described herein.

The accumulator arrangement is provided for a hybrid or electric vehicle and has several battery cells which are stacked in stacking direction to form at least one battery block. The accumulator arrangement has, in addition, a fluid-tight housing in which the at least one battery block is arranged. The accumulator arrangement has, in addition, a cooling device with at least one cooling plate, which lies on one side against the battery block and extends parallel to the stacking direction. The cooling device has at least one cover plate with at least one cooling channel configured to permit a coolant to flow through, which is secured, facing away from the battery block, on the at least one cooling plate. According to an aspect of the disclosure, the at least one cooling plate forms an outer contour of the fluid-tight housing. The at least one cooling channel of the cover plate is, in addition, open towards the at least one cooling plate and is closed by the at least one cooling plate.

In the accumulator arrangement according to an aspect of the disclosure, the at least one battery block is cooled from the exterior, and the housing remains fluid-tight. The cooling plate forms the outer contour of the housing; in other words, the cooling plate forms a wall of the housing and can be both an integral component and also an additional part of the housing. The coolant flows through the cooling channel of the cooling device, which is formed between the at least one cooling plate and the at least one cover plate, and can also, in the case of a leak of the cooling device, not penetrate to the battery block and to the battery cells braced in the battery block. In this advantageous manner, the battery cells in the accumulator arrangement are protected from the coolant and the risk of fire in the event of a leak of the cooling device is advantageously minimized. The at least one cooling plate can be formed from metal, preferably steel or aluminum. The at least one cover plate and the at least one housing part can be made of metal, typically steel or aluminum, or of plastic.

Advantageously, provision can be made that the at least one cooling plate is formed by a wall region of a housing part. Here, the at least one open cooling channel of the cover plate is open towards the wall region of the housing part and is closed by the wall region. The wall region can then lie expediently against the at least one battery block in a heat-transmitting manner, and the housing part can be formed for example from a heat-conducting material, typically steel or aluminum. Generally, the configuration of the accumulator arrangement can vary. Thus, the accumulator arrangement can have a housing part which encloses all the battery blocks of the accumulator arrangement. Alternatively, the accumulator arrangement can also have several housing parts which then enclose several battery blocks in the accumulator arrangement individually or in groups. The respective housing part can be configured so as to be trough-shaped and can enclose the at least one battery block towards a housing cover. Several wall regions can also be formed on the housing part as cooling plates which lie against one or also against several battery blocks. The respective housing part can also be a wall which runs in a four-sided manner around the at least one battery block and delimits the housing towards the exterior between opposite housing covers. Furthermore, one or several cover plates can be secured on a cooling plate. Irrespective of the configuration of the cooling device, the battery cells in the housing of the accumulator arrangement remain sealed towards the exterior and are effectively protected from the penetration of the coolant in the case of a leak of the cooling device.

Alternatively or additionally, the at least one cooling plate can form a housing cover of the housing and can close a housing part of the housing in a fluid-tight manner towards the exterior on at least one open side. Generally, the configuration of the accumulator arrangement can vary. Thus, the accumulator arrangement can have a housing part which encloses all the battery blocks of the accumulator arrangement. Alternatively, the accumulator arrangement can also have several housing parts which then enclose several battery blocks in the accumulator arrangement individually or in groups. The cooling device can have a cooling plate which lies on one side against one or more battery blocks of the accumulator arrangement. In this case, the respective housing part is configured so as to be trough-shaped and encloses the at least one battery block towards the cooling plate—which forms a housing cover. Alternatively, the cooling device can also have two cooling plates, which lie, opposite one another, against one or else against several battery blocks. In this case, the respective housing part is a wall which runs in a four-sided manner around the at least one battery block and delimits this towards the exterior between the two cooling plates—which form respectively a housing cover. Several cooling plates can also be arranged on one side, which cooling plates lie against individual battery blocks or against groups of the battery blocks. Furthermore, one or else several cover plates can be secured on a cooling plate. Irrespective of the configuration of the cooling arrangement, the battery cells in the housing of the accumulator arrangement remain sealed towards the exterior and effectively protected from the penetration of the coolant in the case of a leak of the cooling device.

In summary, the accumulator arrangement can be configured in various ways. In particular, the configuration of the housing is freely adaptable according to existing cooling requirements, according to the available installation space and according to the desired level of protection. Possible exemplary embodiments of the fluid-tight housing are explained in further detail below.

The housing can thus have the single housing part with an open side and with a wall region lying opposite the latter, wherein the single housing part is trough-shaped and receives the at least one battery block. Alternatively, the housing can have the single housing part with two open sides lying opposite one another, wherein the single housing part receives the at least one battery block and runs around it in a four-sided manner. The housing can also have several housing parts with respectively an open side and with respectively a wall region and several battery blocks, wherein the respective housing part is trough-shaped and receives at least one of the respective several battery blocks. It is also conceivable that the housing has several housing parts with respectively two open sides lying opposite one another, and has several battery blocks. The respective housing part then receives at least one of the respective several battery blocks and runs around the latter in a four-sided manner.

The cooling device can advantageously have the single cooling plate, which then closes the single housing part on its one open side or closes the several housing parts, open at one side, on their open sides. Expediently, the open sides of the housing parts are then arranged on a housing side or respectively facing a housing side. Alternatively, provision can be made that the accumulator arrangement has at least two cooling plates. The respective cooling plate closes here one or some or several housing parts respectively on the open side or is formed by a wall region of the housing part. Here, expediently all of the open sides are closed and thereby the outwardly fluid-tight housing of the accumulator arrangement is formed. When the housing has the several housing parts which are open on one side, the respective cooling plates can be arranged on a housing side and can close the respective housing parts individually or in groups on this one housing side. Alternatively, it is conceivable that the respective cooling plates are associated with two opposite housing sides and close the housing parts which are open on both sides. It is also conceivable that on one side some of the respective cooling plates close the open sides of the housing parts, and on the other side the remaining cooling plates are formed by the wall regions of the housing parts. It is also conceivable that two cooling plates are provided, which close on both sides the single housing part which is open on both sides. It is also conceivable that two cooling plates are provided, wherein the one cooling plate closes the single housing part which is open on one side, and the other cooling plate is formed by the wall region of this housing part.

The at least one cover plate of the cooling device can advantageously lie against one or against some or against all cooling plates of the accumulator arrangement. The accumulator arrangement can also have several cover plates which are arranged on one or both opposite housing sides. The number of cover plates is adapted in the accumulator arrangement in such a way that one cover plate lies against each cooling plate.

It is noted that the respective housing part always has an open side through which the at least one battery block is received. The respective housing part then has, lying opposite this open side, either a second open side or a flat wall region. The open side of the housing part is closed here with a cooling plate in the form of a flat housing cover. However, the wall region can also represent a cooling plate. In other words, the cooling plate can be formed integrally on the housing part or respectively in one piece with the housing part.

In order to improve the cooling of the battery cells, provision can be made advantageously, irrespective of the configuration of the at least one cooling plate, that the cooling device has several cooling elements. The respective cooling element is braced here in the battery block between the adjacent battery cells, in a heat-transmitting manner with the latter, and is arranged transversely to the stacking direction in a heat-transmitting manner against the at least one cooling plate. In this advantageous manner, the heat generated in the battery cells can be dissipated via the cooling elements effectively to the cooling plate and, via the cooling plate, can be delivered to the coolant. The respective cooling elements can be made of metal, typically aluminum, and can be secured to the at least one cooling plate in a materially bonded manner—for example by soldering or gluing or welding. Alternatively, the cooling elements can rest against the at least one cooling plate. Between the cooling elements and the at least one cooling plate in addition a thermally conductive paste can be applied, in order to intensify the heat exchange between the cooling elements and the at least one cooling plate. Advantageously, on the at least one cover plate an inlet connection and an outlet connection can be formed or secured, facing away from the cooling plate, via which connections the at least one cooling channel in the at least one cover plate can be connected fluidically toward the exterior. Tubes or lines can then be secured to the inlet connection and to the outlet connection, via which the coolant can be delivered to the at least one cooling channel of the cooling device in a circuit, and discharged.

Advantageously in the at least one cooling plate, formed as a housing cover, provision can be made that the at least one housing part has at least on one side a circumferential flange and is secured with the flange to the at least one cooling plate by a first fastener. The first fastener connects mechanically the at least one housing part with the at least one cooling plate. Here, the first fastener typically includes several screws, and the at least one housing part is typically screwed to the at least one cooling plate. By the flange and the first fastener, the at least one housing part can be fastened securely and in a sealing manner on the at least one cooling plate.

Additionally, provision can be made that the at least one cover plate is also fastened on the at least one cooling plate by the first fastener. Alternatively to the first fastener, the at least one cover plate can be fastened on the at least one cooling plate by a second fastener. The second fastener mechanically connects the at least one cover plate with the at least one cooling plate. Here, the second fastener typically includes several screws, and the at least one cover plate is typically screwed to the at least one cooling plate. The second fastener can secure the at least one cover plate on the edge side circumferentially on the at least one cooling plate. Alternatively, the at least one cover plate can be secured detachably or non-detachably on the edge side circumferentially and centrally—and expediently spaced apart with respect to the at least one cooling channel—on the at least one cooling plate. In particular thereby a raising of the cover plate from the cooling plate in the event of an increased coolant pressure in the cooling channel, and thereby a leak of the cooling device, can be prevented. A detachable securing can be realized for example by a screw connection and a non-detachable securing can be realized for example by an adhesive, soldered, caulked, riveted or welded connection. It is self-evident that the at least one cover plate can be secured by the second fastener in the same manner on the at least one cooling plate which is formed as a wall region of the housing part.

Advantageously in the case of the at least one cooling plate formed as a housing cover, provision is made that a ring seal is braced between the flange of the at least one housing part and the at least one cooling plate. The ring seal is spaced apart from the first fastener inwards or respectively towards the at least one battery block. In the case of a leak of the cooling device, the coolant can then indeed penetrate to the fastener, however the at least one battery block remains protected from the coolant by the ring seal. When the first fastener includes, for example, several screws, the coolant can indeed penetrate through screw openings between the at least one cooling plate and the at least one housing part, however it cannot penetrate to the at least one battery block. The ring seal can be formed from an elastic material and can be arranged for example in an annular groove in the at least one cooling plate and/or in the at least one housing part. In the case of the at least one cooling plate formed as a wall region of the housing part, this ring seal is unnecessary, because the wall region is an integral component of the housing part and does not need any additional seal to this.

Advantageously, irrespective of the configuration of the at least one cooling plate, provision can be made that a ring seal, encircling the cover plate on the edge side, is braced between the at least one cover plate and the at least one cooling plate. The ring seal is then spaced apart from a fastener towards the interior or respectively towards the at least one cooling channel. The fastener can be both the first fastener and also the second fastener. The ring seal can be formed from an elastic material and can be arranged for example in an annular groove in the at least one cooling plate and/or in the at least one cover plate. In order to prevent a penetration of the coolant to the fastener in the case of a leak of the cooling device, the at least one cover plate can additionally have a leakage channel with an outlet opening for the coolant to run out in the case of a leak. The leakage channel is then arranged between the ring seal and the fastener, spaced apart with respect to these, and runs around the ring seal. If the cooling device is leaky at the ring seal, the coolant can thus run out through the leakage channel. The safety of the accumulator arrangement can thereby be increased.

In order to reinforce the at least one housing part, in the case of the at least one cooling plate formed as a housing cover, several reinforcement ribs can be formed on the flange of the at least one housing part. Alternatively, provision can be made that the at least one housing part is curved in an edge region adjoining the flange, and a reinforcement structure is formed or secured in the curved edge region. The reinforcement structure can include for example several reinforcement ribs which are formed integrally on the at least one housing part or respectively are formed in one piece with the at least one housing part. Through the reinforcement ribs or the reinforcement structure, the at least one housing part can be additionally reinforced, so that in the case of an accident the at least one housing part withstands more severe stresses. Generally, also in the case of the at least one cooling plate formed as a wall region of the housing part, the housing part can have a flange which faces a housing cover and is secured on the latter and is reinforced as described above. Advantageously, provision can be made that the at least one cooling plate, formed as a housing cover, has a circumferential and flat or undulating edge. The edge is secured on the at least one cooling plate or is in one piece therewith and projects from the at least one cooling plate to the at least one battery block and/or to the at least one cover plate. The cooling plate can be additionally reinforced by the edge, so that the safety of the accumulator arrangement can be increased.

According to a further aspect of the disclosure, the accumulator arrangement has a supporting frame. The housing of the accumulator arrangement is secured in the supporting frame by a third fastener. The third fastener mechanically connects the housing of the accumulator arrangement with the supporting frame. The third fastener typically includes several screws, so that the housing of the accumulator arrangement is screwed to the supporting frame. The housing is supported on a transverse beam or a side edge of the supporting frame. The third fastener can also replace the first fastener and/or the second fastener, and in the case of the at least one cooling plate formed as a housing cover, can secure the housing on the supporting frame and, at the same time, can secure the at least one housing part and/or the at least one cover plate on the at least one cooling plate. The at least one housing part is secured in a sealing manner on the at least one cooling plate, and the at least one cover plate is secured in a sealing manner on the at least one cooling plate. The housing rests with the at least one cooling plate or with the at least one cover plate onto the transverse beam or the side edge of the supporting frame.

In addition, irrespective of the configuration of the at least one cooling plate, the accumulator arrangement can have a protection arrangement which is secured on the supporting frame and which forms, for the housing, an underride protection plate and/or a protective cover and/or an interior protective cover. The protection arrangement is typically made of metal and enables an additional flame protection, an additional stone chip protection, a fire protection of the at least one battery block within the housing and a protection against electromagnetic radiation of the housing. With the accumulator arrangement mounted in the hybrid or electric vehicle, the underride protection plate is arranged beneath the at least one battery block and according to a configuration of the accumulator arrangement beneath the cooling device, and can protect the housing from below. With the accumulator arrangement mounted in the hybrid or electric vehicle, the protection cover can protect the housing to the hybrid or electric vehicle. The interior protective cover can be arranged inside the housing and can enable an additional fire protection for the at least one battery block.

It shall be understood that the features mentioned above and to be explained further below can be used not only in the respectively indicated combination, but also in other combinations or in isolation, without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
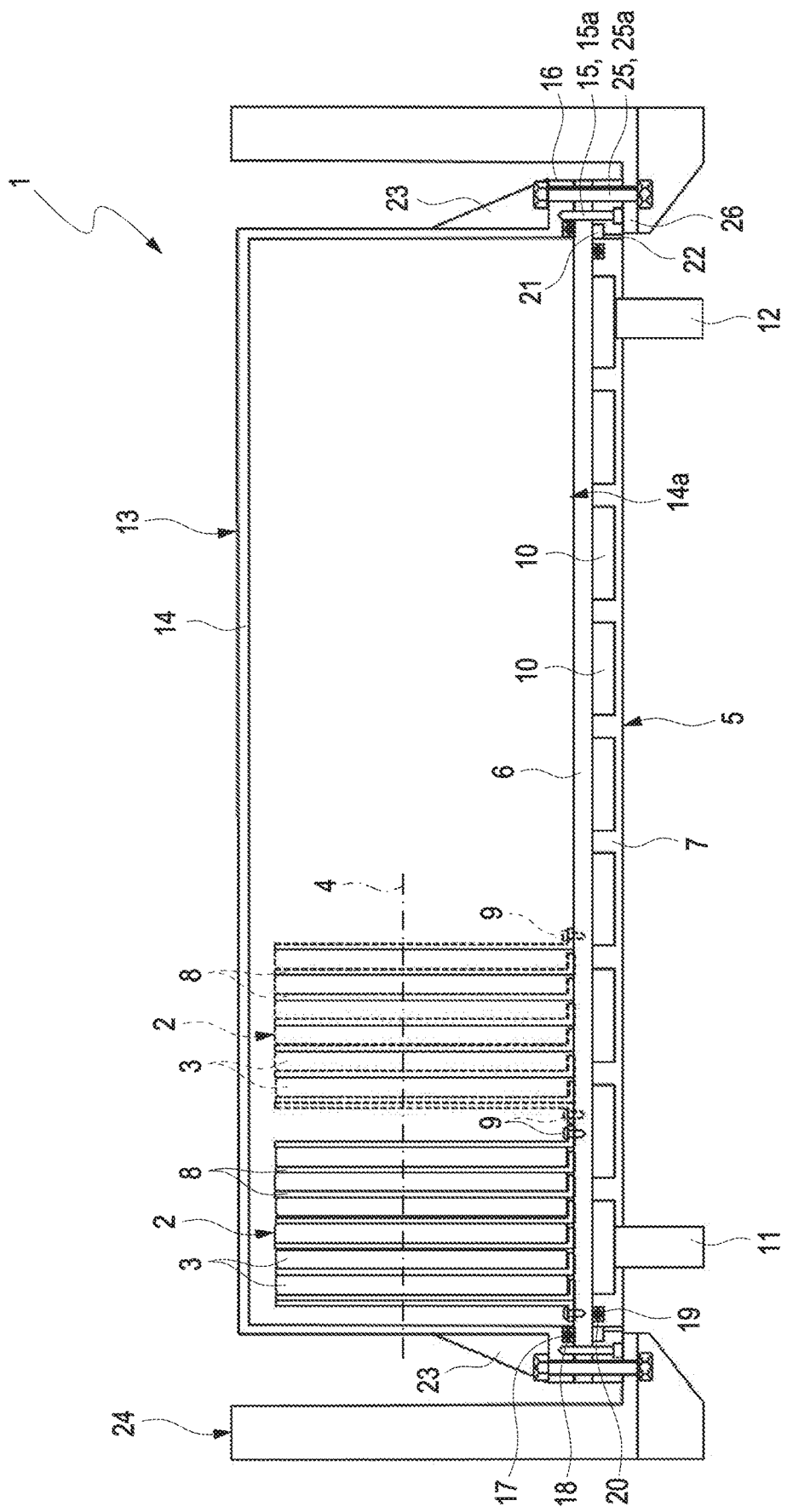
FIG. 1 shows a sectional view of an accumulator arrangement according to an exemplary embodiment of the disclosure.

FIG. 1 shows a sectional view of an accumulator arrangement 1 according to an exemplary embodiment of the disclosure for a hybrid or electric vehicle. The accumulator arrangement 1 has several battery blocks 2 here only two thereof are shown, for clarity of several battery cells 3. The individual battery cells 3 are stacked against one another in stacking direction 4 in the respective battery block 2. The accumulator arrangement 1 has, in addition, a cooling device 5, which in this exemplary embodiment includes a cooling plate 6 and several cooling elements 8. The cooling plate 5 lies on one side against the respective battery blocks 2 and, in this exemplary embodiment, extends parallel to the stacking direction 4. The L-shaped cooling elements 8 are arranged between the battery cells 3 and are in contact with these and with the cooling plate 6 in a heat-transmitting manner. On the contact elements 8, arranged laterally in the stacking direction 4, the respective battery block 2 is secured on the cooling plate 6 by side screws 9, so that the respective battery blocks 2 are secured on the cooling plate 6 in stacking direction 4. The cooling plate 6 and the respective cooling elements 8 can be made of metal, typically aluminium. The cooling elements 8 can be secured on the at least one cooling plate 6 in a materially bonded manner—for example by soldering or gluing or welding—, or can rest on the latter. In addition, a thermally conductive paste can be arranged between the cooling elements 8 and the cooling plate 6.

The cooling device 5 has, in addition, a cover plate 7 which, facing away from the respective battery blocks 2, lies against the cooling plate 6. In the cover plate 7, several cooling channels 10 are formed, through which a coolant can flow. The cooling channels 10 of the cover plate 7 are open towards the cooling plate 6 and are closed by the cooling plate 6. On the cover plate 7 in addition, facing away from the cooling plate 5, an inlet connection 11 and an outlet connection 12 are formed, which fluidically connect the cooling channels 10 in the cover plate 7 toward the exterior. The cover plate 7 can be made of metal, typically steel or aluminium, or of plastic.

The accumulator arrangement 1 has, in addition, a housing 13, which has a trough-shaped housing part 14 and the cooling plate 6—which forms a housing cover. The housing part 14 of metal or of plastic can be made in one piece or joined together from several individual housing parts for example by gluing, screwing, riveting, welding or soldering. The cooling plate 6 is arranged on an open side 14a of the housing part 14 and closes the latter. The housing part 14 is secured on the cooling plate 6—or respectively on the housing cover—by a first fastener 15—here screws 15a—, wherein a ring seal 17 is braced between the cooling plate 6 and a flange 16 of the housing part 14. The screws 15a can be replaced by a glued, a welded, a soldered, a clamped, a caulked or a riveted connection. The ring seal 17 is secured here in an annular groove 18 in the housing part 14 and between the first fastener 15 and the battery blocks 2, so that in the case of a leak of the cooling device 5, the coolant cannot penetrate to the battery blocks 2. The housing 13 is thereby completely protected from the coolant and the fire risk in the case of a leak of the cooling device 5 is advantageously minimized. In addition, the ring seal 17 protects the battery blocks 2 from dirt.

In this exemplary embodiment, the cover plate 7 is also secured to the cooling plate 6 by the first fastener 15. The cooling channels 10 are sealed towards the exterior by a further ring seal 19 which is braced between the cooling plate 6 and the cover plate 7 in an annular groove 20. The ring seal 19 is spaced apart from the first fastener 15 inward towards the cooling channels 10. Between the first fastener 15 and the ring seal 19 in addition a leakage channel 21 is formed, which encircles the ring seal 19. In the case of a leak in the cooling device 5, the coolant is collected in the leakage channel 21 and runs out therefrom through an outlet opening 22. By the leakage channel 21, a penetration of the coolant to the first fastener 15 is advantageously prevented.

The accumulator arrangement 1 has in addition a supporting frame 24 with a side edge 26, on which the housing 13 of the accumulator arrangement 1 rests and is secured by a third fastener 25—here several screws 25a. The third fastener 25 additionally lays the cooling device 5 and the housing part 14 against one another and secures these on the supporting frame 24. The supporting frame 24 can be secured on a body of the electric or hybrid vehicle or can be at least partially formed thereon. By the supporting frame 24, the housing 13 is additionally protected laterally in the case of an impact. In addition, on the flange 16 of the housing part 14 several reinforcement ribs 23 are integrally formed, by which the housing part 14 can withstand more severe stresses.

Figure 2:
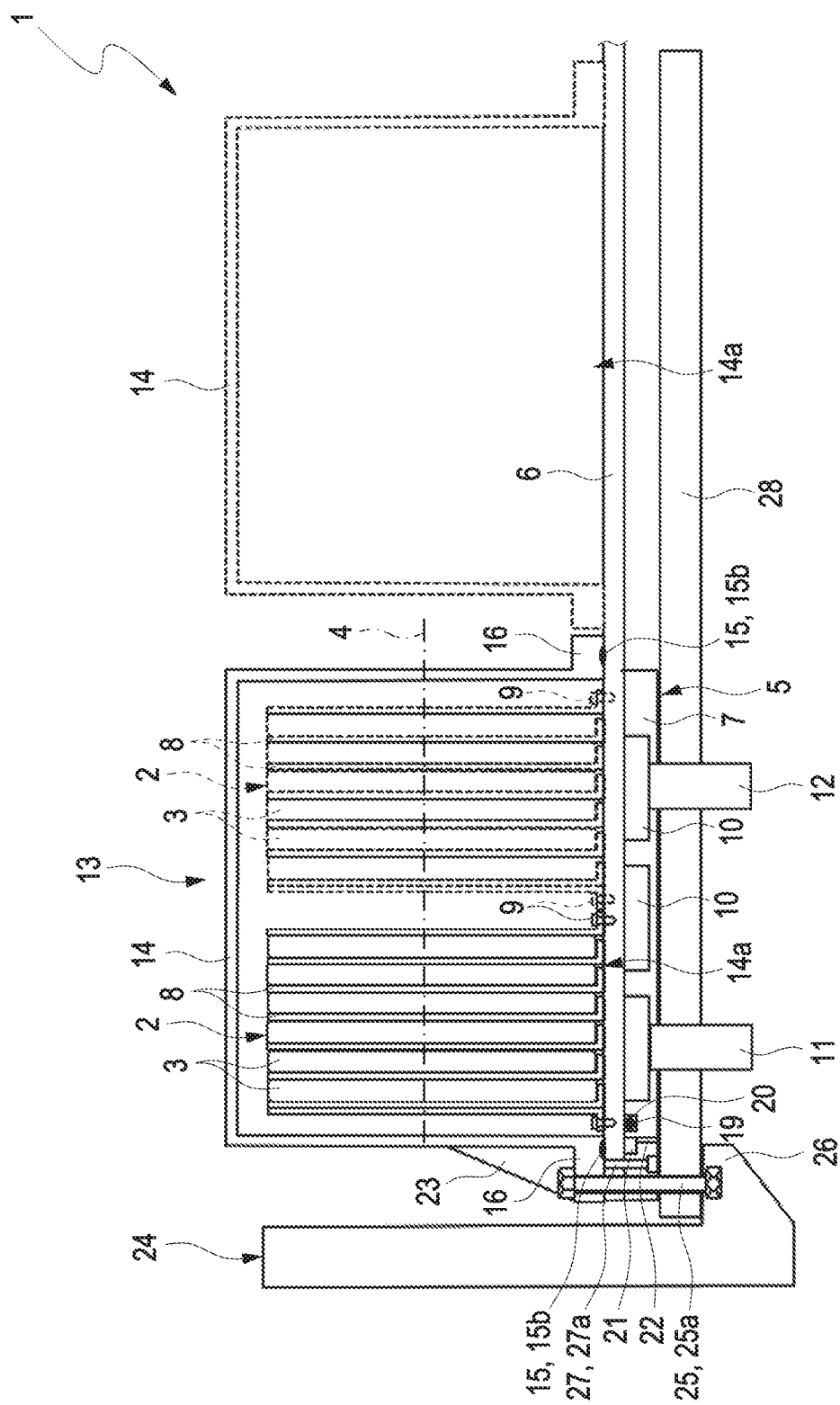
FIG. 2 shows a sectional views of an accumulator arrangements according to another exemplary embodiment of the disclosure

FIG. 2 shows a sectional view of a differently configured accumulator arrangement 1. Differing from the accumulator arrangement 1 shown in FIG. 1, the accumulator arrangement 1 has several housing parts 14, which surround groups of the battery blocks 2—only one group of the battery blocks 2 is shown here for clarity. The respective housing part 14 is secured on the cooling plate 6 by the first fastener 15—here an adhesive connection 15b. The one adhesive connection 15b can be replaced by a screwed, a welded, a soldered, a clamped, a caulked or a riveted connection. In addition, the cooling device 5 has several cover plates 7—only one cover plate 7 is shown here, for clarity—, which are associated with the respective groups of the battery blocks 2. The respective cover plates 7 are secured on the cooling plate 6 by a second fastener 27—here screws 27a. The screws 27a represent a pre-assembly; the cover plate 7 can be additionally secured on the cooling plate 6 by the second fastener 15. The second fastener 15 can be the adhesive connection 15a, or alternatively a welded, a soldered, a clamped, a caulked or a riveted connection. The housing 13 of the accumulator arrangement 1 is supported onto a transverse beam 28, which rests onto the side edge 26 of the supporting frame. The third fastener 25 then secures the housing 13 on the supporting frame 24. Otherwise, the accumulator arrangement 1 which is shown in FIG. 2 corresponds to the accumulator arrangement shown in FIG. 1.

Figure 3:
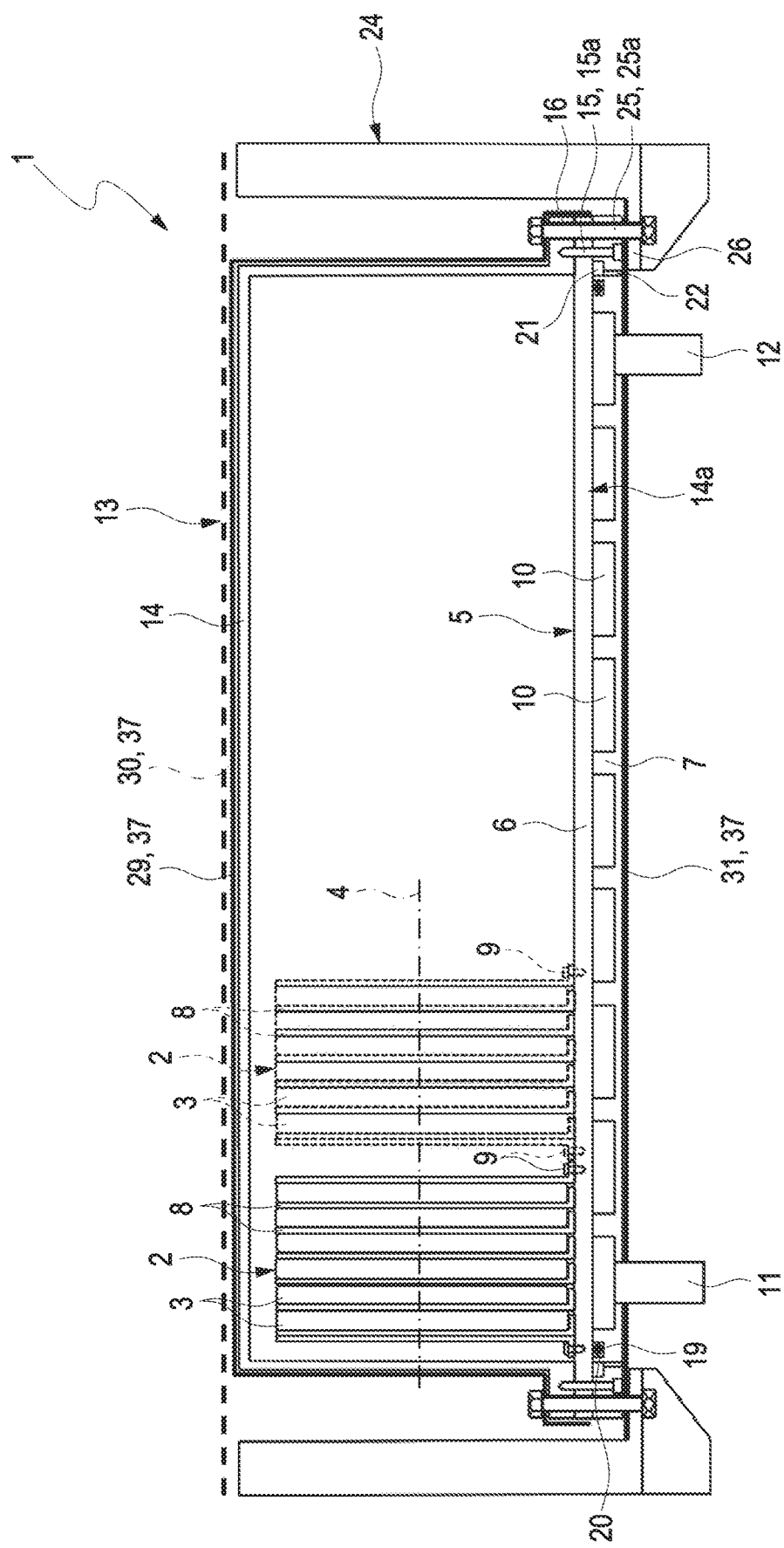
FIG. 3 shows a sectional views of an accumulator arrangements according to a further exemplary embodiment of the disclosure.

FIG. 3 shows a sectional view of a further differently configured accumulator arrangement 1. To protect the housing 13, the accumulator arrangement 1 has a protection arrangement 37. The protection arrangement 37 has a protective cover 29, which follows the housing part 14 in its shape and surrounds the latter, facing a vehicle floor. The protective cover 29 is secured by the first fastener 15—here screws 15a—on the housing part 14 and on the cooling plate 6. The protection arrangement 37 can alternatively or additionally have a further protective cover 30—as indicated by dashed lines. An underride protection plate 31 of the protection arrangement 37 further protects the housing 13 of the accumulator arrangement 1, facing away from the vehicle floor. The protective covers 29, 30 and the underride protection plate 31 can be made of metal or of plastic. Differing from the accumulator arrangement 1 shown in FIG. 1, the housing part 14 has no reinforcement ribs 23. In addition, the accumulator arrangement has no ring seal 17, and the housing part 14 and the cooling plate 6 are pressed with one another in a sealing manner. Otherwise, the accumulator arrangement 1 which is shown in FIG. 3 corresponds to the accumulator arrangement in FIG. 1.

Figure 4:
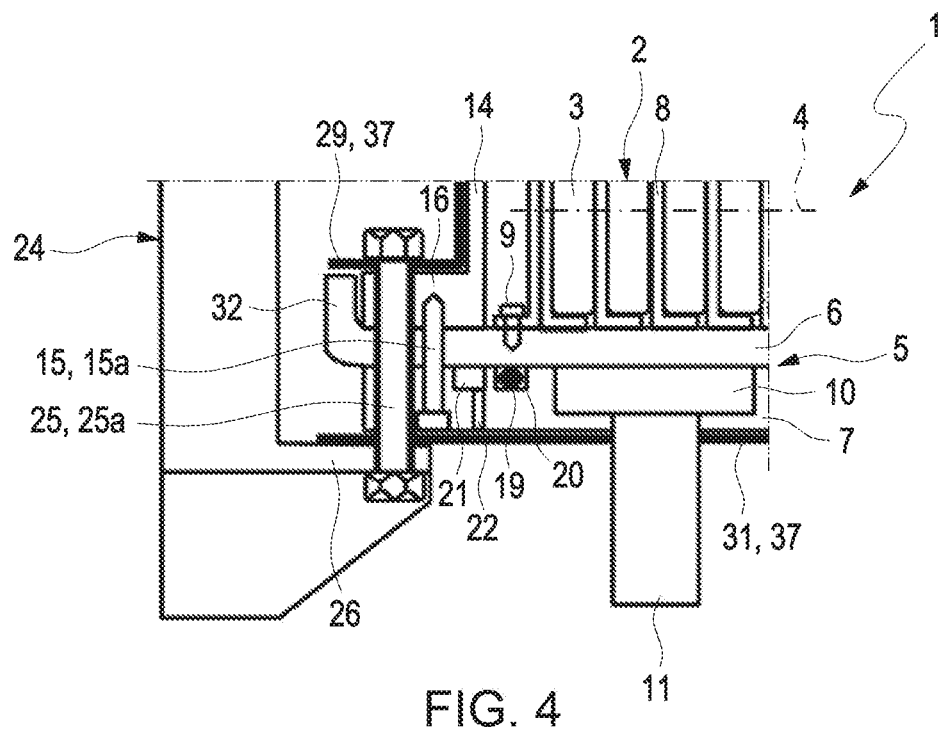
FIG. 4 shows a partial sectional view of the accumulator arrangement at a connection site with a supporting frame according to an exemplary embodiment of the disclosure.
Figure 5:
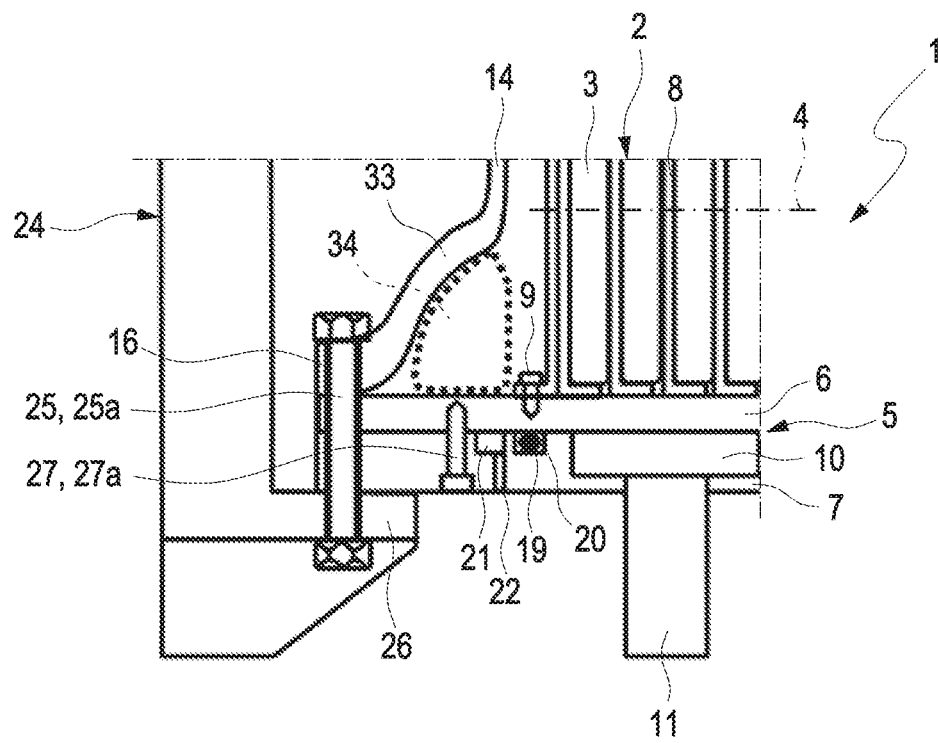
FIG. 5 shows a partial sectional view of the accumulator arrangement at a connection site with a supporting frame according to another exemplary embodiment of the disclosure.

FIG. 4 shows partially a sectional view of the accumulator arrangement 1 at a connection site of the housing 13 with the supporting frame 24. Here, differing from the exemplary embodiments described above, the cooling plate 6 has an edge 32 which additionally reinforces the cooling plate 6. FIG. 5 shows partially a sectional view of the accumulator arrangement 1 at a connection site of the housing 13 with the supporting frame 24. Differing from the exemplary embodiments described above, the housing part 14 is formed here in a curved shape in an edge region 33 adjoining its flange 16. In the curved edge region 33, a reinforcement structure 34 is then secured. The housing part 14 is secured on the cooling plate 6 by the third fastener 25, which thereby replaces the first fastener 15 in the accumulator arrangement 1.

Figure 6:
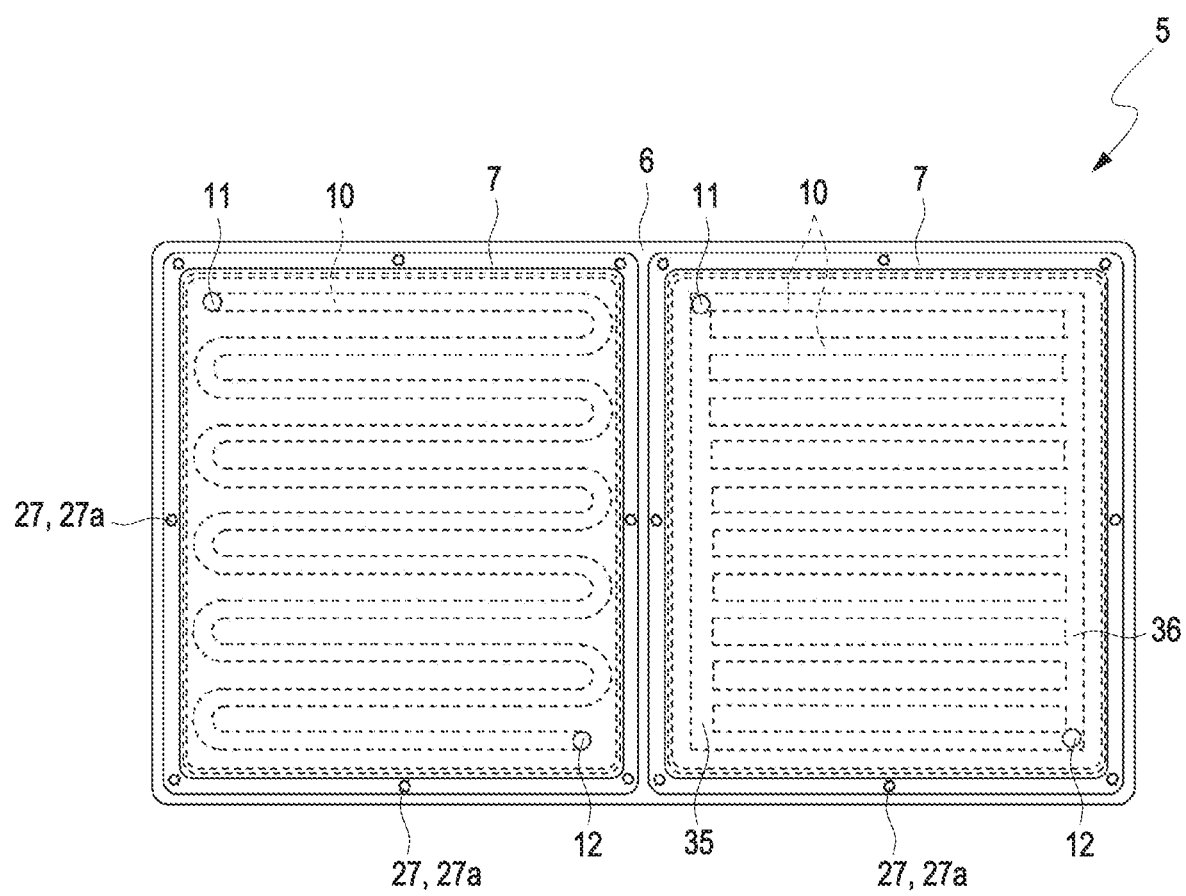
FIG. 6 shows a view of a cooling device in the accumulator arrangement according to an exemplary embodiment of the disclosure.

FIG. 6 shows a view of the cooling device 5 in the accumulator arrangement 1. The cooling device 5 includes cooling plate 6 and two cover plates 7 arranged adjacent to one another. In the respective cover plates 7, the cooling channels 10 are formed, which can be connected toward the exterior by the inlet connections 11 and the outlet connections 12. In the cover plate 7 shown on the left, the individual cooling channel is configured in a meandering shape and connects the inlet connection 11 with the outlet connection 12. In the cover plate 7 illustrated on the right, several cooling channels 10 open respectively on one side into a distributor channel 35 with the inlet connection 11 and into a collecting channel 36 with the outlet connection 12. It shall be understood that the exemplary embodiments, shown in FIG. 6, of the at least one cooling channel 10 in the at least one cover plate 7 are provided by way of example. The at least one cooling channel 10 in the at least one cover plate 7 can have any desired shape.

In the accumulator arrangement 1 according to the exemplary embodiment of the disclosure, the respective housing part 14 and the cooling plate 6 with the cover plate 7 form the housing 13 which is sealed toward the exterior. The coolant cannot penetrate to the battery blocks arranged in the housing 13 also in the case of a leak of the cooling device 5. Thereby, a destruction of the battery cells 3 can be prevented, and the fire risk in the accumulator arrangement 1 can be advantageously minimized both in the case of an accident and also in normal operation.

It is understood that the foregoing description is that of the exemplary embodiments of the disclosure and that various changes and modifications may be made thereto without departing from the spirit and scope of the disclosure as defined in the appended claims.

What is claimed is:

1. An accumulator arrangement for a hybrid or electric vehicle, the accumulator arrangement comprising:
a fluid-tight housing;
a plurality of battery cells stacked in a stacking direction to form at least one battery block, the at least one battery block being arranged in the fluid-tight housing configured to seal the plurality of battery cells from an outside environment; and
a cooling device including at least one cooling plate arranged on one side on the at least one battery block and at least one cover plate including at least one cooling channel through which a coolant can flow, the at least one cover plate being secured on the at least one cooling plate facing away from the at least one battery block, the at least one cooling plate forming an outer contour of the fluid-tight housing, and the at least one cooling channel of the at least one cover plate being open towards the at least one cooling plate and being closed by the at least one cooling plate.

2. The accumulator arrangement according to claim 1, wherein:
the at least one cooling plate is formed by a wall region of a housing part, and
in the wall region, the at least one cooling channel of the at least one cover plate is open towards the wall region of the housing part and is closed by the wall region.

3. The accumulator arrangement according to claim 1, wherein the at least one cooling plate forms a housing cover of the fluid-tight housing and closes a housing part of the fluid-tight housing on an open side in a fluid-tight manner towards the exterior.

4. The accumulator arrangement according to claim 3, wherein at least one housing part has a circumferential flange at least on one side and is secured with a flange on the at least one cooling plate by a first fastener.

5. The accumulator arrangement according to claim 4, wherein:
the at least one cover plate is also fastened on the at least one cooling plate by the first fastener, or the at least one cover plate is secured on the at least one cooling plate by a second fastener, wherein the second fastener secures the at least one cover plate on an edge side circumferentially or secures the at least one cover plate on the edge side circumferentially and centrally on the at least one cooling plate detachably or non-detachably.

6. The accumulator arrangement according to claim 4, wherein between the flange of the at least one housing part and the at least one cooling plate, a ring seal is braced spaced apart from the first fastener towards the interior or respectively towards the at least one battery block.

7. The accumulator arrangement according to claim 4, wherein:
on the flange of the at least one housing part, several reinforcement ribs are formed, which reinforce the at least one housing part, or
the at least one housing part is curved in an edge region adjoining the flange, and a reinforcement structure is formed or secured in a curved edge region.

8. The accumulator arrangement according to claim 3, wherein the at least one cooling plate has a circumferential and flat or undulating edge secured on the at least one cooling plate or is in one piece therewith, and which projects from the at least one cooling plate to the at least one battery block and/or to the at least one cover plate.

9. The accumulator arrangement according to claim 1, wherein:
between the at least one cover plate and the at least one cooling plate, a ring seal is braced, encircling the at least one cover plate on an edge side, and
the ring seal is spaced apart from a fastener towards the interior or respectively towards the at least one cooling channel.

10. The accumulator arrangement according to claim 9, wherein:
the at least one cover plate has a leakage channel with an outlet opening for the coolant to run out in a case of a leak, and
the leakage channel is arranged between the ring seal and the fastener, spaced apart therefrom, and runs around the ring seal.

11. The accumulator arrangement according to claim 1, wherein on the at least one cover plate, facing away from the at least one cooling plate, an inlet connection and an outlet connection are formed or secured, via which the at least one cooling channel can be connected fluidically toward the exterior in the at least one cover plate.

12. The accumulator arrangement according to claim 5, further comprising:
a supporting frame, in which the fluid-tight housing of the accumulator arrangement is secured by a third fastener, and
wherein the fluid-tight housing is supported on a transverse beam or a side edge of the supporting frame.

13. The accumulator arrangement according to claim 12, further comprising:
at least one protection arrangement, made of metal, secured on the supporting frame, and including an underride protection plate or a protective cover for the fluid-tight housing or an interior protective cover for the at least one battery block within the fluid-tight housing.

14. The accumulator arrangement according to claim 1, wherein:
the at least one cover plate and the fluid-tight housing are at least partially made of metal, steel, aluminium, or plastic, and/or
the at least one cooling plate is made of the metal, the steel, or the aluminium.

15. The accumulator arrangement according to claim 1, wherein:
the cooling device includes a plurality of cooling elements,
a respective cooling element of the plurality of cooling elements is braced between adjacent battery cells in the at least one battery block to take up heat from the adjacent battery cells, and
a portion of the respective cooling element is arranged transversely to the stacking direction on the at least one cooling plate such that heat is transmitted from the respective cooling element to the at least one cooling plate.

16. The accumulator arrangement according to claim 1, wherein:
the fluid-tight housing includes a single housing part with two open sides lying opposite one another, and the single housing part receives the at least one battery block and runs around the at least one battery block on four sides, or
the fluid-tight housing includes a plurality of housing parts with respectively an open side and with a wall region lying opposite thereto, and several battery blocks,
a respective housing part of the plurality of housing parts receives at least one of a plurality of battery blocks, or
the fluid-tight housing includes the plurality of housing parts with respectively two open sides lying opposite one another, and the plurality of battery blocks, and the respective housing part receives at least one of the plurality of battery blocks and runs around the at least one of the plurality of battery blocks in a four-sided manner.

17. The accumulator arrangement according to claim 16, wherein:
the cooling device includes at least two cooling plates,
a respective cooling plate of the at least two cooling plates closes one or the plurality of housing parts respectively on the open side or is formed by the wall region of the housing part, and
all open sides are closed and thereby the fluid-tight housing of the accumulator arrangement, sealed towards the exterior, is formed.

18. The accumulator arrangement according to claim 16, wherein:
the at least one cover plate of the cooling device lies against one or against a plurality of cooling plates of the cooling device, and
the at least one cover plate of the cooling device is configured such that at least one region of the at least one cover plate lies against each cooling plate.

19. An accumulator arrangement for a hybrid or electric vehicle, the accumulator arrangement comprising:
a fluid-tight housing;
a plurality of battery cells stacked in a stacking direction to form at least one battery block, the at least one battery block being arranged in the fluid-tight housing; and
a cooling device including at least one cooling plate arranged on one side on the at least one battery block and at least one cover plate including at least one cooling channel through which a coolant can flow, the at least one cover plate being secured on the at least one cooling plate facing away from the at least one battery block, the at least one cooling plate forming an outer contour of the fluid-tight housing, and the at least one cooling channel of the at least one cover plate being open towards the at least one cooling plate and being closed by the at least one cooling plate, wherein the cooling device includes a plurality of cooling elements, wherein a respective cooling element of the plurality of cooling elements is braced between adjacent battery cells in the at least one battery block to take up heat from the adjacent battery cells, and wherein a portion of the respective cooling element is arranged transversely to the stacking direction on the at least one cooling plate such that heat is transmitted from the respective cooling element to the at least one cooling plate.

\* \* \* \* \*